United States Patent Office 3,362,662
Patented Jan. 9, 1968

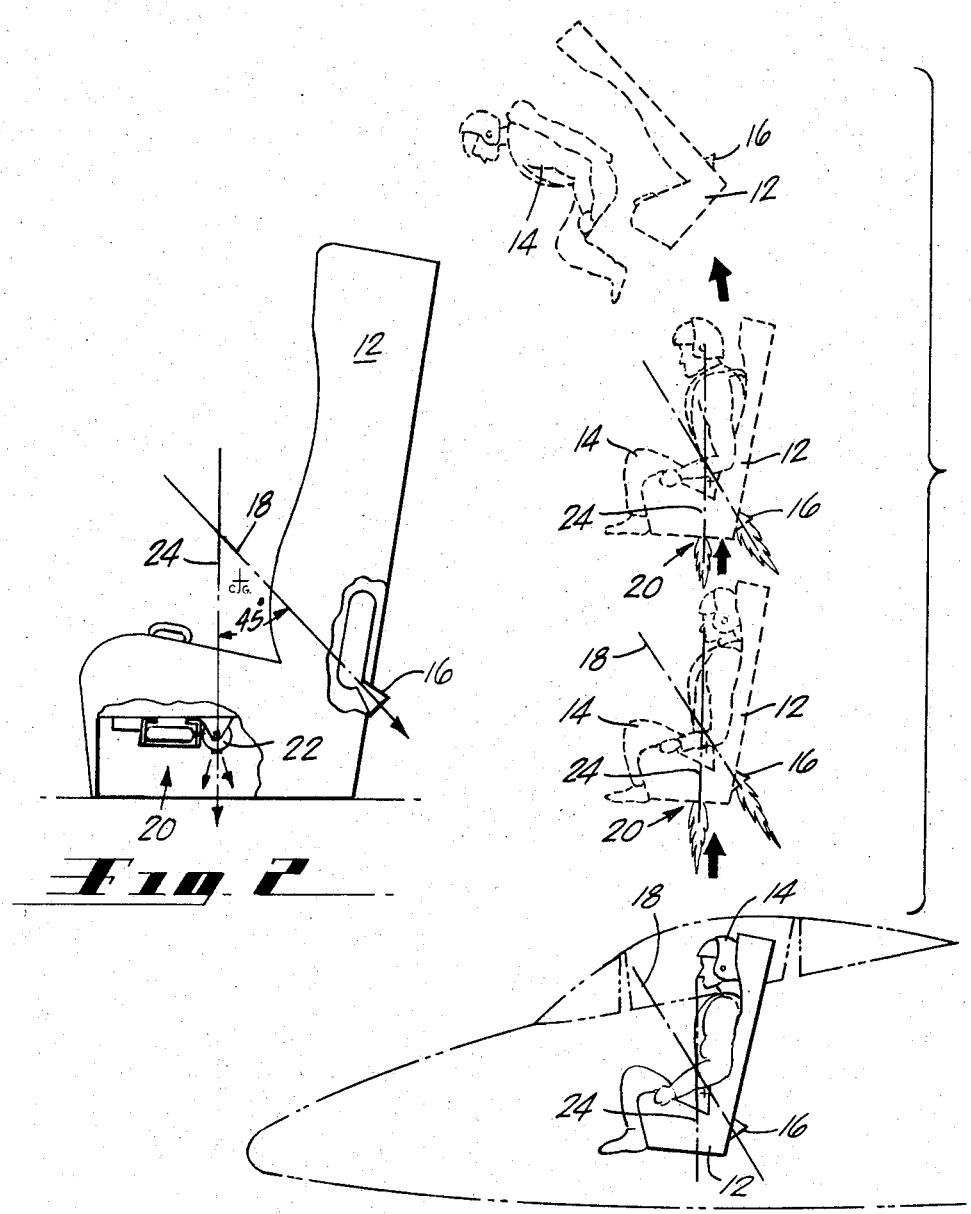

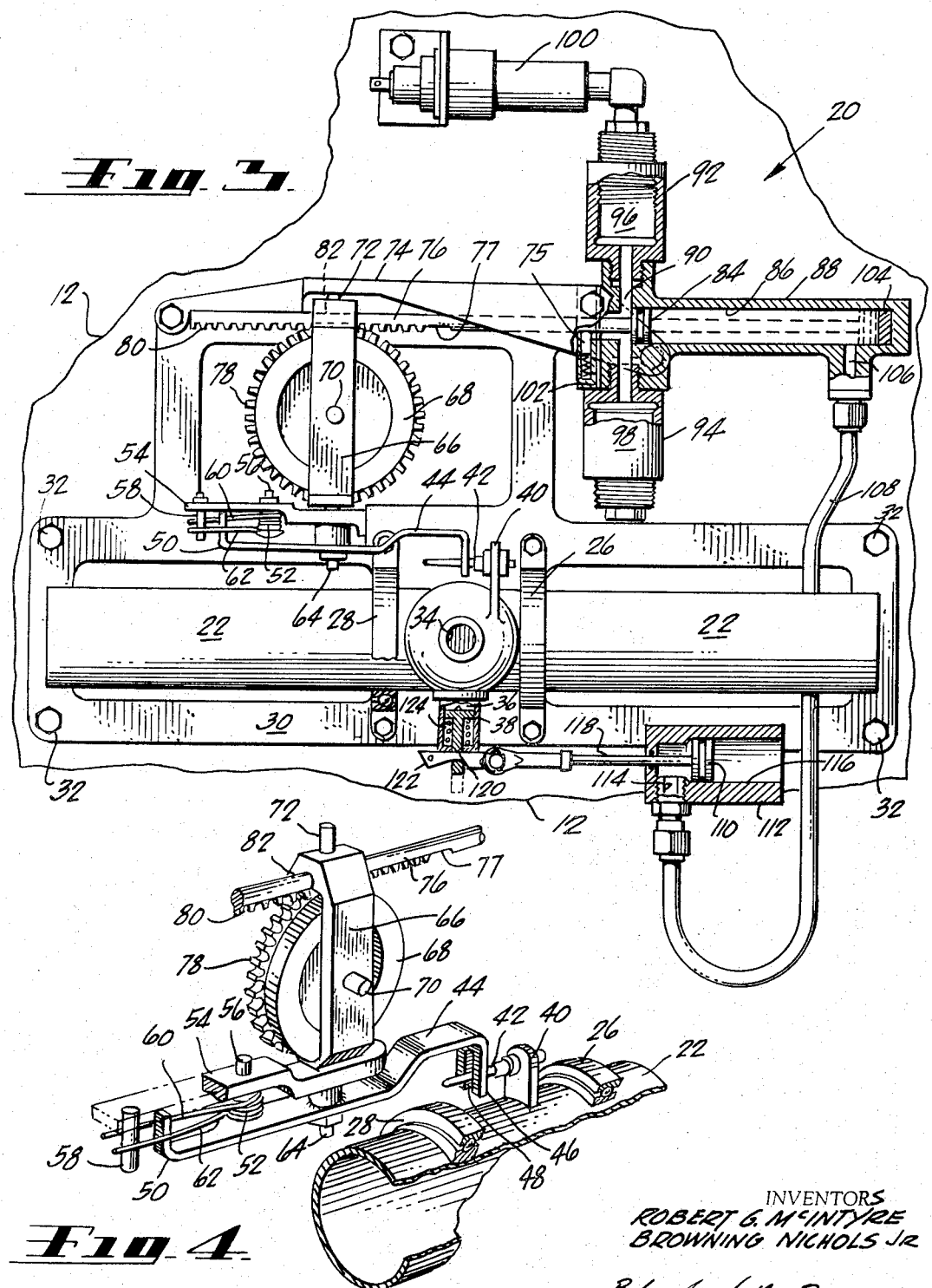

3,362,662
GYRO CONTROLLED EJECTION SEAT STABILIZING ROCKET
Robert G. McIntyre, Manhattan Beach, and Browning Nichols, Jr., Culver City, Calif., assignors, by mesne assignments, to McDonnell Douglas Corporation, Santa Monica, Calif., a corporation of Maryland
Filed June 1, 1966, Ser. No. 554,448
9 Claims. (Cl. 244—122)

This invention relates to aircraft seats of the ejection variety, and pertains more particularly to a seat of this type that will become oriented into a preferred position.

Much effort has been spent in establishing a safe ejectment procedure for aircraft pilots. The commonly employed procedure is to eject the pilot and seat in an upward direction away from the aircraft and earth below, the seat and pilot being maintained in its initial ejected position. The seat and pilot are catapulted from the aircraft and then propelled upward by means of a propelling rocket located on the back of the seat at its lower edge. After burn out of the propelling rocket, the seat and pilot soon reach the apogee of the ejection trajectory. At this time, the pilot separates from the seat, thereafter assuming the normal parachute descent to the earth.

However, in the above procedure, a major difficulty has arisen. The propelling rocket has a fixed line of thrust, the thrust line passing through the center of gravity of the pilot and seat. If the line of thrust fails to be so aligned, rotational torque will be applied to the seat (and pilot) producing an undesirable angular velocity. Such an effect is commonly referred to as pitch and is hazardous to the pilot as he may be redirected toward his own aircraft or it could prevent separation of the pilot from the ejection seat and the opening of the parchute. Also, if ejection is attempted at a low altitude, insufficient altitude may be available for a parachute descent.

Several devices have been proposed to prevent such seat rotation. However, all presently employed devices require some form of connecting means between the seat and aircraft. Also, devices employed heretofore are not smooth in their correctional torque but comprise a series of quick movements to counteract the undesired rotational torque.

The aircraft ejection seat rotation preventing device of this invention overcomes the above objections easily and also provides additional advantages over devices used heretofore. This invention relates to a control rocket being attached directly to the ejection seat, the control rocket having a variable line of thrust. A gyroscope is directly connected through a suitable mechanical linkage arrangement to the control rocket. As the inherent function of a spinning gyro upon being acted upon by an outside force is to align its rotational axis in the plane of the rotational force, the gyro is arranged to control the line of thrust of a control rocket and thereby counteract the ejection seat rotational torque. Suitable apparatus is provided to ignite the rocket and rotate the gyro upon ejectment of the ejection seat.

It is an object of this invention to provide a new and novel device to counteract the rotational torque of aircraft ejection seats upon ejectment.

Another object of this invention is to employ a gyroscopic type of control to counteract the undesired seat rotation.

Another object of this invention is to wholly contain the control device within the ejection seat thereby requiring no connection between the seat and the aircraft after ejectment.

Another object of this invention is to provide a control device which employs a continuous and smooth correcting movement.

Other objects and advantages of the invention will become apparent as the description of the invention proceeds with particular reference to the accompanying drawings wherein an embodiment of the invention is depicted, in which:

FIGURE 1 is a sequential view picturing an aircraft seat and its occupant in various catapulted stages;

FIG. 2 is a side elevational view, partly in section, of an aircraft seat embodying the apparatus of this invention;

FIG. 3 is a part-sectional plan view of the apparatus of this invention as it would be installed in an aircraft ejection seat, and FIG. 4 is a perspective view of the gyroscope and adjacent mechanism shown in FIG. 3.

For the purpose of establishing various relative positions that occur during a seat ejectment, an aircraft 10 has been pictured schematically in FIG. 1. The specific construction of the aircraft 10 is unimportant to an understanding of the invention, and therefore need not be depicted in detail.

Within the aircraft 10 is mounted a seat 12, a pilot 14 seated therein. The seat 12 and pilot 14 upon ejectment from the aircraft 10 are propelled upwardly by the thrust from the primary rocket 16. The line-of-thrust 18 of the primary rocket 16 is designed to pass through the combined center of gravity of the pilot and seat. If the line-of-thrust is so aligned, the seat and pilot would be propelled upwardly in perfect vertical alignment and with no rotational movements. However, as the line-of-thrust of the primary rocket is fixed and the combined center of gravity is variable because of the different size and weight of the pilots, such perfect line-of-thrust alignment is practically impossible. Since any misalignment causes sufficient rotational torque which affects seat trajectory, some means must be employed to maintain the desired trajectory of the aircraft seat.

To counteract such rotational torque a secondary thrust rocket apparatus 20 is provided. Apparatus 20 is located on the under portion of the seat 12 and securely fastened thereto. The secondary rocket 22 is positioned so its line-of-thrust 24 also passes approximately through the combined center of gravity of the seat and pilot. The secondary rocket 22 is shown as being cylindrically shaped and rotatably mounted by bearings 26 and 28 on frame 30. Frame 30 is securely fastened by bolts 32 to the aircraft seat 12. Rocket 22 is of conventional construction, the specific construction of such forming no part of this invention. It is to be noted that rocket 22 is mounted within bearings 26 and 28 allowing rotational movement within one plane. The plane of movement is to control the pitch of the aircraft seat. Pitch is the most hazardous of the rotational movements with roll and yaw being secondary. Second and third gyro control rocket units could be employed to control both roll and yaw, however, the principal movement is due to pitch usually not requiring a means to control roll and yaw. Rocket 22 has a nozzle 34, primer 36, firing pin 38 and a fixed arm 40. Arm 40 includes a head portion 42 which is to be engaged by an actuator 44. Actuator 44 is formed to coact with head portion 42 through a bifurcated tip section 46, head portion 42 being slidably contained within slot 48 of the tip section 46. The back section 50 of the actuator 44 is spring biased by a centering spring 52. Spring 52 is supported by bolt 56 on a plate 54 which is fixed to frame 30.

The spring 52 has depending arms 60 and 62. Spring 52 is installed so arms 60 and 62 are biased toward each other but spaced apart by a stop pin 58. Back section 50 of the actuator 44 is positioned between arms 60 and 62. When the actuator 44 is moved from its rest position with the back section 50 contacting other arm 60 or 62, the respective arm tends to counteract such movement and force the actuator 44 to its rest position. However, such actuator movement is necessary to the operation of the invention, the only function of the spring 52 being to facilitate quickness of movement of the actuator to its rest or center position. Also, the spring prevents over correction of the control torque.

Intermediate the back section 50 and tip portion 46, the actuator 44 is pivotally secured to plate 54 by means of pivot pin 64. Pivot pin 64 is securely fixed to the actuator 44 at one end and fixed to a gimbal 66 at the other end. Gimbal 66 is U-shaped with a rotatable wheel 68 mounted through shaft 70 parallel to the apex of the U-shaped gimbal 66. Pivot pin 72 supports the other end of the gimbal 66 in the fixed support 74. The center line of rotation of both pivot pins 64 and 72 is identical with the center line passing through the center of gravity of the wheel 68. The combination of the wheel 68 and the gimbal 66 is commonly known as a gyroscope.

The wheel 68 is rotatable by a gas operated piston rod 76. The periphery of the wheel 68 is cogged as at 78 to engage one end of rod 76 through teeth 80. Rod 76 is slidably retained within aperture 82 in gimbal 66 thereby allowing only longitudinal movement of the rod 76 and maintaining engagement of the rod 76 and wheel 68. The meshed teeth relationship between the wheel 68 and rod 76 might be more aptly referred to as a "rack and pinion." Attached to the other end of the rod 76 is a piston head 84. Piston head 84 is slidable within a cylinder 86 located in housing 88. An annular inlet chamber 90 is provided at the front end of the housing 88. With the piston head 84 positioned nearest the front end of the housing 88, the rod 76 is located to give maximum contacting distance with the wheel 68.

Exteriorly of annular chamber 90 there is provided two accumulators 92 and 94. Each accumulator 92 and 94 has a storage chamber 96 and 98, respectively. A gas supply means 100 is provided and connected to annular chamber 90 through accumulators 92 and 94. The function of the accumulators 92 and 94 is to provide a large quantity of gas at a predetermined pressure to act against piston head 84 thereby causing constant acceleration of the piston head 84. It has been found that to rotate the wheel 68 to the necessary r.p.m., the piston rod 76 must travel at a certain rate. This rate is accomplished with a 250 pound initial force applied to the piston head 84. Therefore, a shear pin 102 is provided through rod 76 to hold the piston head 84 until the required force is applied to piston head 84. For example, to rotate the gyro to 7000 r.p.m. a 250 pound initial gas pressure force must be applied to piston head 84 with 3 inches of piston travel. A shock absorbing means 104 is provided at the back end of the housing 88 to prevent the head 84 from inertial movement after operation. A small segment of soft metal has been found to be satisfactory, however, several conventional non-metal materials could be employed. Also, to prevent rebound movement of rod 76 a spring pressed plunger 75 located in housing 88 is adapted to coact with detent 77 located in rod 76. Once rod 76 is fully extended, plunger 75 is engaged with detent 77 preventing backward movement of rod 76 which would interfere with the rotating wheel 68.

Near the back end of housing 88 a gas outlet port 106 is provided. A gas line 108 conducts the gas discharge from cylinder 86 and port 106 to a second gas operated piston 110 and housing 112 through port 114. Piston 110 is slidable within cylinder 116 located in housing 112. Piston 110 is connected to a piston rod 118 which is connected to firing pin 38. The rod 118 operates within a slot 120 in firing pin 38. The end portion of rod 118 is beveled to form a protruding cam 122. Upon the gas pressure operating piston 110, cam 122 causes firing pin 38 to retract and compress firing pin spring 124. When the cam 122 becomes disconnected with firing pin 38, firing pin 38 is forced forward by spring 124 thereby igniting control rocket 22. It is to be noted that since the firing pin 38 is operated with the discharge of gas from the gyro operating piston 84, the rocket 22 is not fired until the gyro is rotating at the desired speed.

The operation of the invention will now be explained in detail. Because of adverse conditions, it is necessary for a pilot 14 of aircraft 10 to employ the ejection seat apparatus. The seat 12 and pilot 14 are catapulted from the aircraft with the primary rocket 16 initiating the thrust to propel the seat and pilot upward. Upon the catapulating action gas under pressure is supplied to the accumulators 92 and 94 from a separate supply means 100 (as shown in the drawing) or from a supply means used in the catapulting procedure. Upon the gas reaching the predetermined pressure, shear pin 102 is broken thereby causing longitudinal movement of piston 84 and connecting rod 76. Through the toothed connection between rod 76 and wheel 68, wheel 68 is rotated. As wheel 68 is supported on a gimbal 66, it thereupon acts like a gyroscope. Gimbal 66 is mounted on the horizontal lower surface of the aircraft seat 12 with the longitudinal axis of the gimbal 66 being in a longitudinal or fore and aft relationship with respect to seat 12. Once piston 84 has been fully extended the remaining gas under pressure is conducted to the second piston 110 and cylinder 116 arrangement which causes movement of rod 118. Such action causes the operation of firing pin 38 which ignites control rocket 22. The line-of-thrust of rocket 22 is variable in a vertical plane through the combined center of gravity of the seat 12 and pilot 14. If the seat starts to rotate either clockwise or counter-clockwise from its initial ejected position, the gyroscope rotates rocket 22 through actuator 44 to provide a thrust which will counteract the seat rotational movement. In this manner the seat and pilot are maintained in their correct alignment for continuing the safe ejection procedure.

It will be obvious to those skilled in the art that various changes may be made in the invention without departing from the spirit and scope thereof and therefore the invention is not limited to that which is illustrated in the drawings and described in the specification, but only as indicated in the accompanying claims, wherein.

We claim:

1. A device for preventing rotation of an aircraft ejection seat after ejection comprising:
   a thrust producing means mounted on said seat;
   a gyroscope including a rotatable wheel, said gyroscope being supported by a gimbal being securely mounted to said seat, said gyroscope being operatively associated with said thrust producing means through said gimbal to vary the direction of thrust of said thrust producing means in such a manner as to counteract any rotational movement of said seat and maintain said seat in its initial plane;
   an actuating means being connected to said gyroscope, said actuating means functioning to cause rotation of said wheel at a predetermined instant after initiation of the ejection sequence;
   an operating means connected to said thrust producing means, said operating means functioning to initiate operation of said thrust producing means being later in time than the activation of said actuating means.

2. A device for preventing rotation of an aircraft ejection seat in space as defined in claim 1 wherein:
   said actuating means comprising a first gas operated piston, said gas operated piston being connected to said gyroscope through a series of cogs.

3. A device for preventing rotation of a chair-like object in space as defined in claim 2 wherein:
   said operating means comprises a second gas operated piston, said operating means being connected to said actuating means in such a manner as to employ the discharge of operating gas from said actuating means after actuation of said first gas operated piston.

4. A device for preventing rotation of a chair-like object in space as defined in claim 2 wherein:

a gas supply means for providing pressurized gas to said actuating means;

an accumulating means being provided adjacent said actuating means, said accumulating means functioning to store the pressurized gas from said supply means thereby allowing the maximum application of force to said first gas operated piston.

5. In combination with an aircraft seat capable of being ejected from the aircraft, said seat having a primary thrust producing means to propel said seat a substantial distance from the aircraft upon ejection, the improvement comprising:

a secondary thrust producing means secured to said aircraft seat, the line-of-thrust of said secondary thrust producing means being capable of being varied, said line-of-thrust variance being controlled by the operation of a gyroscope, whereby the variance of the line-of-thrust of said secondary thrust producing means being such as to counteract rotational movements of said aircraft seat upon ejectment thereby maintaining the initial ejected position of said aircraft seat.

6. The combination as defined in claim 5 wherein:

an actuating means being connected to said gyroscope, said actuating means functioning to rotate said gyroscope upon activation;

an operating means connected to said secondary thrust producing means, said operating means functioning to initiate operation of said secondary thrust producing means, said initial operation of said secondary thrust producing means being later in time than the activation of said actuating means.

7. The combination as defined in claim 6 wherein:

said actuating means comprising a first gas operated piston, said gas operated piston being connected to said gyroscope through a series of cogs.

8. The combination as defined in claim 7 wherein:

said operating means comprises a second gas operated piston, said operating means being connected to said actuating means in such a manner as to employ the discharge of operating gas from said actuating means after actuation of said first gas operated piston.

9. The combination as defined in claim 7 wherein:

a gas supply means for providing pressurized gas to said activating means;

an accumulating means being provided adjacent said actuating means, said accumulating means functioning to store the pressurized gas from said supply means thereby allowing the maximum application of force to said first gas operated piston.

References Cited

UNITED STATES PATENTS

| 2,740,599 | 4/1956 | Roberts et al. | 244—122 |
| 2,931,598 | 4/1960 | Sanctuary | 244—122 |
| 2,996,272 | 8/1961 | Stott et al. | 244—122 |
| 3,124,324 | 3/1964 | Martin | 244—122 |

MILTON BUCHLER, *Primary Examiner.*

B. BELKIN, *Assistant Examiner.*